United States Patent

[11] 3,604,040

| [72] | Inventor | Richard L. Cohen<br>33 Briar Lane, Roslyn Heights, N.Y. 11577 |
|---|---|---|
| [21] | Appl. No. | 806,138 |
| [22] | Filed | Mar. 11, 1969 |
| [45] | Patented | Sept. 14, 1971 |

[54] CLEANING TOOL FOR PIPE AND FITTINGS
4 Claims, 3 Drawing Figs.

[52] U.S. Cl. .................................................. 15/104.1,
15/23, 279/99
[51] Int. Cl. .................................................. B08b 9/02
[50] Field of Search .......................................... 15/23, 24,
25, 21, 104.05, 104.09, 104.1, 206, 104, 165, 145,
75, 65, 28, 29; 279/83, 99, 104; 306/30, 34, 42

[56] References Cited
UNITED STATES PATENTS

| 874,958 | 12/1907 | Goehns .......................... | 15/65 |
|---|---|---|---|
| 1,575,062 | 3/1926 | Kaiser ............................ | 15/23 |
| 2,469,821 | 5/1949 | Galbraith ...................... | 279/99 |
| 2,510,376 | 6/1950 | Burch ............................ | 15/206 |
| 3,251,085 | 5/1966 | Jacobs .......................... | 15/23 |
| 3,251,086 | 5/1966 | Springer ....................... | 15/28 |

*Primary Examiner*—Edward L. Roberts
*Attorney*—Paul S. Martin

ABSTRACT: A power-driven rotary tool has a chuck that cooperates with a tool shaft having a long spiral groove. The tool is drawn into the power-driven chuck and then it is rotated. Reverse relative rotation of the tool causes it to be ejected. The preferred tool is a wire brush having bristles held between twisted wires that form the tool shaft and provide spiral grooves.

PATENTED SEP 14 1971 3,604,040

INVENTOR.
Richard L. Cohen
BY
Paul S Martin

CLEANING TOOL FOR PIPE AND FITTINGS

The present invention relates to rotary power-driven tools. The invention is especially applicable to a power-driven rotary wire brush for cleaning copper and brass pipe and fittings to prepare them for making solder joints. While other applications of the invention will be readily apparent to those skilled in the art, the following discussion is devoted to the wire brush which is the prime application presently contemplated.

It is of special importance to plumbers who use wire brushes for cleaning copper and brass pipe and sweat fittings to be able to change wire brushes easily, quickly and economically, so that worn brushes can be replaced and different sizes of brushes can be used in quick succession to clean different sizes of pipe and fittings.

A feature of the present invention is a novel tool shank and chuck that are quickly assembled and quickly separated, by virtue of a long-pitch spiral groove on the tool shaft and a cooperating formation in a chuck. The spiral draws the tool shaft into the chuck as the latter rotates, and when the shaft reaches a stop, the chuck thereafter drives the tool. The long pitch of the spiral, being many times that of conventional machine screws, provides assurance against the shaft binding in the chuck and making removal very difficult.

A further feature resides in the speed and ease with which the tool is releasable from the chuck. A quick wiping motion against the tool manually in the direction of its normal operation is effective to cause the tool to be released from the chuck. Where the drive is slow, the tool can even be released by an accelerating quick wipe while the chuck continues its slow rotation.

A still further important feature of the invention resides in using twisted wires as the shaft of the tool to form two (or more) steep-pitch spiral grooves, and in using a conical-ended screw projecting into a cylindrical bore of the chuck for cooperation with one of the spiral grooves of the wires to draw in or to eject the tool shaft. Whether the shaft is drawn in or ejected depends on the direction of relative rotation of the chuck and the tool shaft. Such construction is of special advantage in the case of wire brushes, where the twisted wires that form the shaft are the same twisted wires that grip transverse wires that are bristles of the wire brush.

The nature of the invention will be better appreciated from the following detailed description of an illustrative embodiment shown in the accompanying drawing, wherein.

Figure 1:
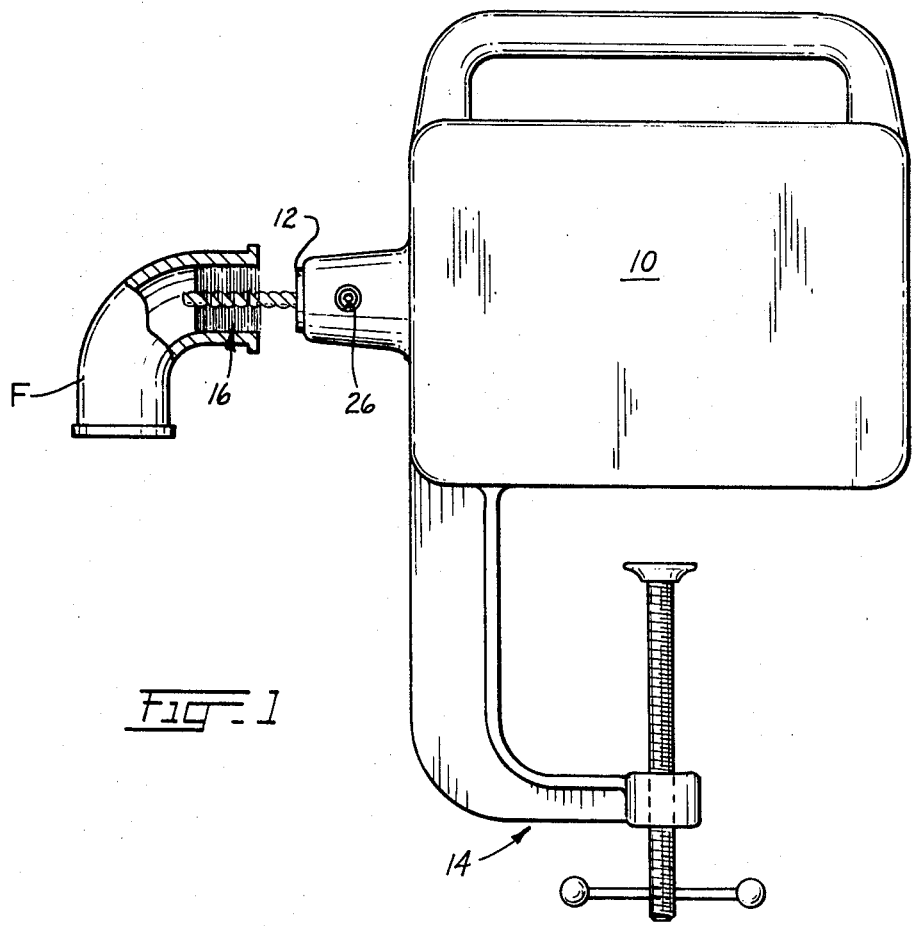
FIG. 1 is a lateral view of a power tool including a wire brush for cleaning metal pipe, including a fitting shown in phantom lines in position to be cleaned.

Referring now to the drawing, housing 10 encloses an electric motor and reduction gearing (not shown) for rotating chuck 12 in one direction. No reversing motor is needed. An internal clamp 14 adapts the drive unit 10, 12 for fixed mounting to a work bench.

Wire brush 16 includes a brush part 18 and a shaft 20. Both parts include portions of a continuous length of twisted wires. Two round wires are twisted together to grip transverse wires that are the bristles of the brush. The same two twisted wires form two lateral spiral grooves in shaft 20.

Figure 2:
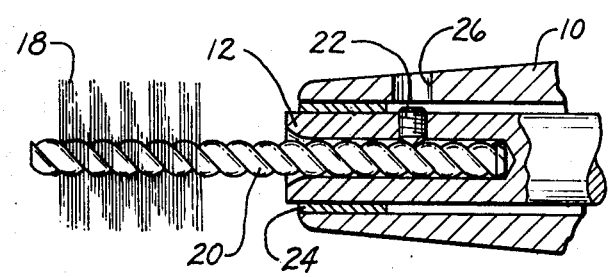
FIG. 2 is a lateral view of the wire brush of FIG. 1 drawn to larger scale, and showing a horizontal cross section of the operating portion of the tool.
Figure 3:
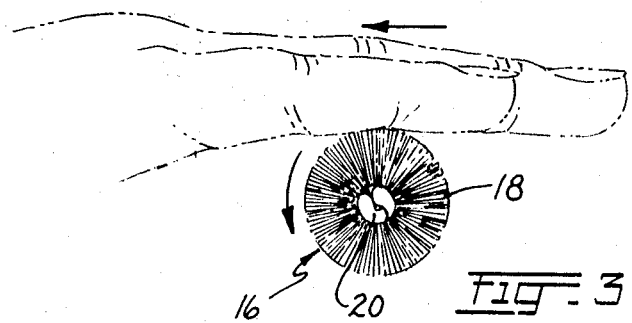
FIG. 3 shows an end of a wire brush and a person's hand in phantom lines, illustrating a method of removing the wire brush from its chuck.

As seen in FIG. 2, chuck 12 has a cylindrical bore that receives shaft 20. A snug but free-sliding fit is desirable. Shaft 20 bears against the bottom of the bore. A setscrew 22 having a conical tip is threaded through the wall of chuck 12. The tip of the screw, being tapered, is received in one of the spiral grooves formed by the round wires that constitute shaft 20. Such setscrews commonly have transverse plastic inserts for locking them securely in any desired position to which they are adjusted. Bearing 24 for chuck 12 serves additionally to provide a clearance space for part of screw 22 that may extend radially outside the shaft in which chuck 12 is formed. Housing 10 has an access hole 26 for adjusting or replacing screw 22.

The direction of rotation of chuck 12 by the electric motor and reduction-gear drive in housing 10 is such that the cooperation of screw 22 with spiral-grooved shaft 20 tend to drive shaft 20 against the bottom of the bore in chuck 12. Any rubbing of the brush against an article to be cleaned results in firm seating of the brush against the bottom of the chuck bore, after which the cooperation of screw 22 of chuck 12 with the spiral-grooved shaft 20 enforces rotation of the brush. By like token, the brush can be inserted for operation merely by slipping shaft 20 into the rotating chuck. The brush may be hand held at this time, and as soon as screw 22 enters a groove of shaft 20, the shaft quickly seats against the bottom of the bore. A suitable safe speed for chuck 12 is 150 r.p.m.

The brush is easily removed for replacement after wear and for substitution of a different size. As shown in FIG. 1, a specially effective use of the brush is to clean the bore of sweat fitting F preparatory to making a solder joint. Different sizes of bores require corresponding sizes of brushes. To remove brush 16, it is only necessary to spin the brush in the normal operating direction. This can even be done while the brush is rotating, by a quick wiping motion of a person's hand, it being required that the hand motion shall be faster than the speed of rotation produced by the chuck. If the brush is not released in one wiping motion, a second such motion can complete the release of shaft 20 from screw 22 and then the brush can be grasped and removed from the chuck.

A distinct advantage of the construction described is that it is virtually immune to binding retention of the brush shaft in the chuck. The steep slope of the groove practically guarantees easy release of the tool whereas, if the pitch of a machine screw were used, there would be a prominent tendency of binding to result from the drive of the shaft 20 against the bottom of the bore. In a highly successful example, the bore diameter was 0.25 inch, and shaft 20 was made of two 10-gage round iron wires to form a slide fit in the bore, there being three convolutions of each wire per inch of shaft length. To distinguish the steep spirals of the present invention from machine-screw threads, this may be contrasted with a typical machine-screw thread of 20 per inch on a ¼-inch-diameter screw. The nonbinding steep pitch of the grooves may be said to be more than several times that of typical machine screws of like diameter particularly where screw 22 is used as the formation in the chuck that cooperates with the groove. Those skilled in the art will understand that there is also an upper limit to the steepness of the pitch, since a groove that is so steep as to be effectively parallel to the shaft would not perform in the manner described. As a rule of thumb, a tangent along the wire at its outer diameter should be in the approximate range of between 30° and 70° to the axis of the shaft.

The use of the same twisted wires that hold the transverse wires for the added purpose of providing the grooved shaft represents an important economy, one that is particularly significant because of the need for more-or-less frequent change or brushes. This economy is achieved and, at the same time enhanced performance is realized as discussed above.

The described illustrative embodiment of the invention includes features which those skilled in the art will readily modify and use in various applications, and therefore the invention should be broadly construed in accordance with its full spirit and scope.

What is claimed is:

1. A power-driven rotary tool, including a chuck, drive means for rotating said chuck in a prescribed direction, and a rotary tool having an axial shaft receivable in said chuck, said shaft being formed of twisted wires forming plural spiral grooves in the shaft having a steep pitch many times longer than that of machine screws, and said chuck having a formation cooperable with a said spiral groove in said shaft effective to advance the shaft into the chuck or out of the chuck in dependence on the relative rotation of the shaft and the chuck, the direction of said grooves being related to the direction of rotation of the chuck by said drive means so that, when the shaft is not rotating and is inserted into the chuck while the chuck is rotating in said prescribed direction, the shaft is drawn into the chuck, said chuck and said shaft including cooperating stop means for limiting the advance of the shaft into the chuck and for thereafter causing the chuck to enforce rotation of the tool.

2. A power-driven tool in accordance with claim 1, wherein said tool is a wire brush having transverse wire bristles retained by said twisted wires.

3. A power-driven tool in accordance with claim 1, wherein said chuck has a cylindrical bore whose diameter slidably receives said twisted wires and wherein said formation is a generally conical projection extending into the bore for cooperation as aforesaid with the spiral grooves formed by said twisted wires.

4. A power-driven tool in accordance with claim 1, wherein the speed on rotation of the chuck and the diameter of the tool and the pitch of the spiral groove are proportioned to enable the shaft to be withdrawn from the chuck by a person making a quick manual wiping motion against the tool so as to rotate the tool faster than its rotation by said drive means.